Feb. 5, 1935.     H. GOLDSMITH     1,990,374
VALVE FOR INFLATABLE ARTICLES
Filed Aug. 20, 1930
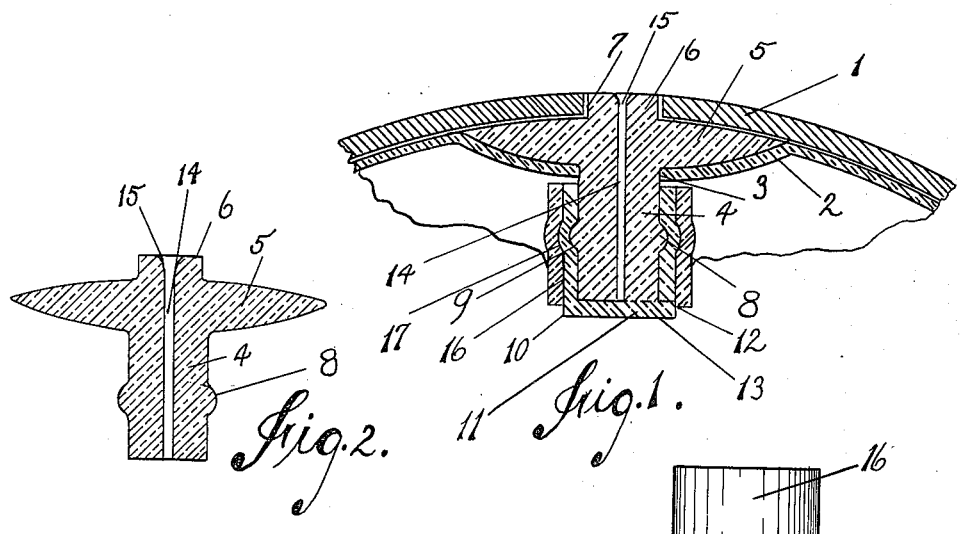
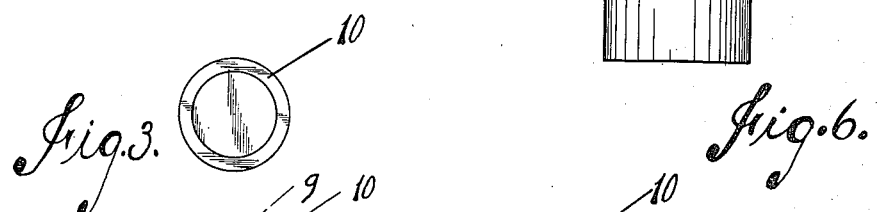
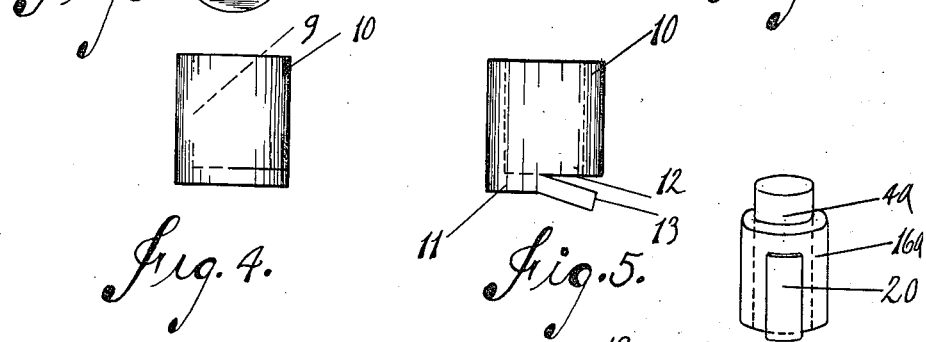
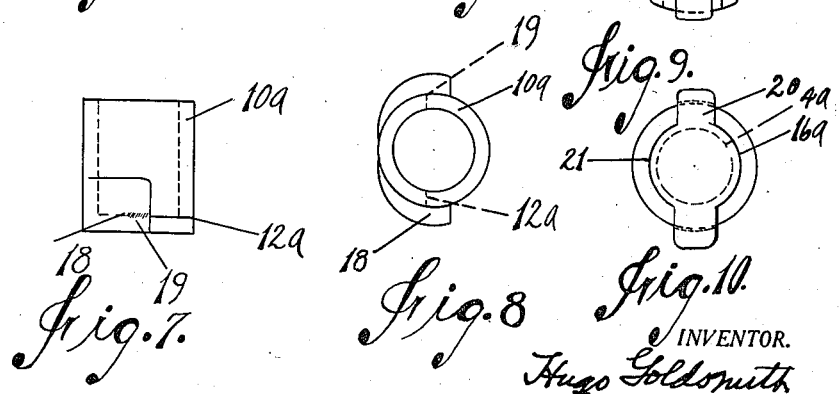
INVENTOR.
Hugo Goldsmith
BY
ATTORNEYS Patented Feb. 5, 1935

1,990,374

UNITED STATES PATENT OFFICE 1,990,374

VALVE FOR INFLATABLE ARTICLES

Hugo Goldsmith, Cincinnati, Ohio

Application August 20, 1930, Serial No. 476,550

3 Claims. (Cl. 273—65)

My invention relates to valves for inflatable articles, such as footballs, volley balls, basketballs, and other playing balls, in which an inflatable bladder is encased in a cover usually made of leather.

In the prior art there has been considerable development in the provision of valve constructions for the bladders of game balls in which the valves may be inflated by inserting a tubular stem into an opening in the valve, and in which the valve has a one-way action which precludes the return of air from the bladder after the inflating tool or stem is withdrawn.

Such valve constructions are particularly adapted for use with game balls in which the cover of the ball has an aperture with which the valve registers so that the ball may be inflated, and, if necessary, deflated, without the necessity of unlacing the laced opening in the ball, if the ball is of the type having a laced opening.

It is an object of my invention to provide a valve construction effective through a principle similar to that shown in the Sonnet Patent No. 1,596,320, but in which additional elements are preferably incorporated which insures the valve more effectively against return leakage through the stem. In the Sonnett patent there is a rubber stem provided with a flange for attachment to the bladder, in which an air passage extends part way through the stem, and in which a transverse slit provides a sealing flap which tends to prevent return leakage through the stem.

It is my object to provide a cup-shaped member surrounding a stem in which the bottom wall of the cup-shaped member is provided with a slit which provides a sealing flap which, independently of the stem, bears against the inner open end of the passage passing through the stem.

Another object of my invention in one preferred modification, is to provide a cup-shaped member having a transversely slitted end or base which may be inserted on the stem on a mandrel or other similar tool.

The above objects and other objects to which reference will be made in the ensuing description, I accomplish by that certain combination and arrangement of parts of which I have shown several preferred modifications.

In the drawing:—

Figure 1 is a sectional view of a portion of a game ball, showing part of the cover, part of the bladder, and the improved valve structure forming the subject matter of my invention.

Figure 2 is a longitudinal sectional view of the valve stem proper.

Figure 3 is a plan view of the cup-shaped member which provides the seal against flow of air through the stem.

Figure 4 is a side elevation of the cup-shaped sealing flap member illustrated in Figure 3.

Figure 5 is a side elevation of the cup-shaped member shown in Figures 3 and 4, with the sealing flap in open position.

Figure 6 is a side elevation of the elastic ring or band which encircles the cup-shaped member.

Figure 7 is a side elevation of the cup-shaped member provided with reinforced ribs or wings adjacent the slitted base of the member.

Figure 8 is a plan view of the member shown in Figure 7.

Figure 9 is a side elevation of the inner end of a valve of slightly modified construction.

Figure 10 is a bottom plan view of the modified type of valve shown in Figure 9.

Referring first to Figure 1, the cover of the ball is indicated at 1. The bladder 2 has an aperture 3 therein through which the valve stem 4 is extended. A flanged portion 5 formed integrally with the stem 4, provides a means, through cementing or vulcanizing, for securing the stem securely to the bladder. The stem has a stub end 6 which registers and extends through an opening 7 in the cover member 1, as disclosed and claimed in the copending application of William A. Sonnett, Serial No. 437,723, filed March 21, 1930.

The stem 4 preferably has a rib 8 which causes the registering portion of the cup-shaped member 10 to bulge out and interlock with the stem as indicated at 9. The member 10 fits over the inner end of the stem 4.

As indicated, the bottom 11 of the cup is provided with a slit 12 which forms a sealing flap 13 which prevents return passage of air through the air passage 14 within the stem. The air passage through the stem may have an enlarged outer end 15 which facilitates the insertion of an inflating stem.

Securely binding the cup-shaped member 10 on the inner end of the stem 4, I have shown a ring 16 which has a portion 17 which bulges out and interlocks with the bulged out portion 9 of the member 10. The registering ribs and circular channels securely hold the cup-shaped member on the stem.

In Figures 7 and 8 I have illustrated a slightly different type of cup-shaped member 10a in which wings 18 extend out from the sides of the cup-shaped member adjacent the slitted opening 12a. If the cup-shaped members 10, 10a are to be inserted on the stems 4 by means of a mandrel, the mandrel will ordinarily have to be extended through the end of the cup which is slitted. So that the slit need not extend too far across the bottom so as to cause likelihood of leakage, in the reinforced construction the slit may first be extended substantially across the bottom of the cup. The cup may then be inserted with the mandrel onto the stem, and after the mandrel is removed, areas 19 of cement may be applied to the slitted portions of the extending reinforcing lugs. This will form a reinforcement for the sealing flap adjacent its medial portion.

In Figures 9 and 10 I have shown a modified construction, in which the cup-shaped member is omitted. Instead I provide the usual stem 4a with the ring 16a surrounding it. A band of rubber 20 is cemented to opposed sides of the ring 16a. The portion of the band which passes across the bottom or inner end of the stem 4a has a flap 21 which seals against the air passage and prevents back leakage through the stem.

While I prefer to employ the combination illustrated in Figure 1, it will be quite obvious that the elimination of the outer band or ring 16 will not affect the principle of operation of the cup with the sealing flap. Modifications in size and shape of the various elements of my combination can be made without departing from the principle involved.

Having thus described my invention, what I claim as new and desire to secure by Letters Patent, is:—

1. A tubular valve comprising a stem having a flange extending therefrom for attachment to an inflatable bladder, said stem having an air passage extending longitudinally therethrough, a cup-shaped member secured on the inner end of said stem having a lateral slit extending into its base forming a semi-circular sealing flap against which the inner end of the passage abuts, and means for increasing the resistance of the sealing flap to displacement.

2. A tubular valve comprising a stem having a flange extending therefrom for attachment to an inflatable bladder, said stem having an air passage extending longitudinally therethrough, a cup-shaped member secured on the inner end of said stem having a lateral slit extending into its base forming a semi-circular sealing flap against which the inner end of the passage abuts, and means for increasing the resistance of the sealing flap to displacement comprising reinforcing wings extending up the side walls of the cup.

3. A valve for an inflatable article comprising a stem of elastic material of substantial mass and firmness of structure for maintaining its shape and its attachment to the article, having a passage from end to end, which is, in cross sectional area, a minor portion of the cross sectional area of the stem, and a closure member of more flexible elastic material, comprising side portions fixed to the sides of the stem near its inner end and an end portion fixed by said side portions across the inner end of said stem, and a flap portion having flexibly hinged connections to said side portions at points near the periphery of said end, said flap extending transversely of and closing the passage, and said closure member having integral lateral extensions, forming reinforcements, close to the respective hinged connections.

HUGO GOLDSMITH.